May 20, 1930.  C. SZMUKLER  1,759,766

COMBINED PUMP AND ELECTRIC MOTOR

Filed July 10, 1925

Inventor
Constantin Szmukler
By B. Singer, Atty.

Patented May 20, 1930

1,759,766

UNITED STATES PATENT OFFICE

CONSTANTIN SZMUKLER, OF GRENOBLE, FRANCE

COMBINED PUMP AND ELECTRIC MOTOR

Application filed July 10, 1925, Serial No. 42,770, and in France July 28, 1924.

This invention relates to pumps combined with electric motors in a single unit and the object of the invention is to provide a pump combined with an electric motor and so arranged that the motor and the pump form a single, compact whole, excluding any coupling means between them and of the common base heretofore employed.

The motor pump heretofore known comprises two elements, on the one hand the pump and on the other hand the driving motor which is usually a continuous or alternating current motor. The pump and its motor have been heretofore mounted generally on a common base, or fixed the one to the other by means of flanges, while their respective shafts have been connected by means of an appropriate coupling.

In the accompanying drawings

Figure 1:
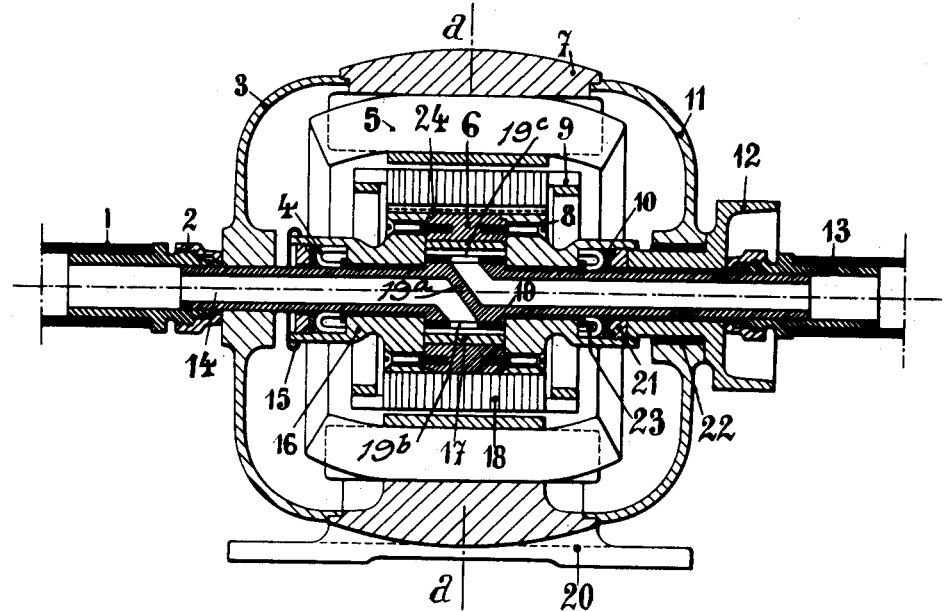
Figure 1 is a longitudinal section through the axis of the machine.
Figure 2:
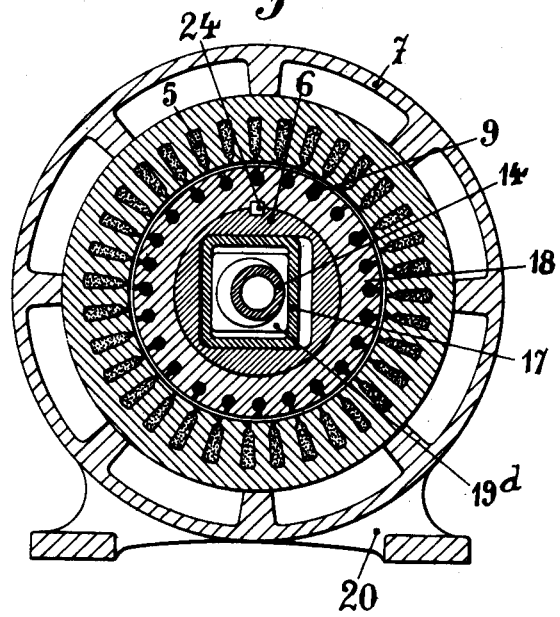
Figure 2 is a transverse section on the line $a-a$ of Figure 1.

The casing of the motor comprises the heads 3, 11, the intermediate cylindrical member 7 and the base 20. A tubular shaft 14 extends axially through the casing and is fixed against rotation. The member 7 constitutes the stator of an electric motor and is provided with the coils 5. The rotor element of the motor comprises the pump body 6, the sheet iron discs 18 and the coils 9.

The sheet iron discs 18 are assembled in the same manner as in the rotor of an electric motor of the usual type. The discs 18 and their winding 9 are fitted on the body 6 of the pump and secured by a longitudinal key 24 and between bushes 16 which are secured to opposite sides of the body by screws 8. The bushes are themselves pushed with slight friction on a hollow shaft 14 surrounded in its middle part by suction cell like plungers 17 and driving cell like plungers 19.

Said shaft is open for the admission of water at one end and the discharge of water at the other end, and has at its center an oblique partition $19^a$ and inlet and discharge ports $19^b$ and $19^c$ at opposite sides of the partition. The plungers revolve with the rotor and are actuated by excentrics $19^d$ with which the shaft 14 is provided. The pump, per se, is known and not claimed here.

A washer 10 presses against stuffing collars 4, provided interiorly with a ring 23 against which is secured a threaded stopper 21 in order to provide an efficient packing.

A ring 15 prevents escape of water and oil.

Whereas heretofore in pumps of the known type the shaft rotates with the element of the pump, connected with it, while the outer body does not move, according to the present invention the shaft 14 remains absolutely immovable, and the concentric body constituted as specified above by the element 6 of the pump, the discs 18 and the coils 9 are arranged to rotate.

It will be now understood, that the system is constituted on the whole as an electric motor, with this difference that the interior of the rotor is formed by the elements of a rotary pump. Under these conditions, when switching on the current, the mass constituted by the discs, their winding and the outer body of the pump rotates with the usual regular speed while the shaft remains fixed. Hence the relative motions of the two elements of the pump are realized.

The shaft is hence hollow and is provided at one end with a bush 13 and at the other end with conical squeezing rings 2 assuring a tight junction with the outer piping 1.

The group motor pump as described comprises also a pulley 12 secured to the body 6 for rotation therewith, and has a ball bearing 22.

The system permits a double employment, the one of a pump as explained and also of an electric motor alone. The revolving part, in case that the same is not utilized for pumping, may be employed for an electric motor.

For this purpose, it is either possible to utilize directly the body of the pump by mounting on the same the pulley 12, as specified previously and indicated in the drawing, or it is possible to utilize the two extremities of the shaft by mounting at one side or at the other a driving pulley for the power transmission as in the usual electric motor.

In this case, it will suffice to enable the rotation of the shaft and to connect at the same time the shaft with the pump body. This can be achieved very simply by means of a clutch system working with keying on and keying off and permitting an easy passage from the employment as a pump to the one as a motor.

The described device can be applied to any electric motor, an alternating current or direct current motor as well as to motors working alternately with these two currents.

What I claim is:

A combined pump and electric motor comprising a pair of casing heads, a fixed tubular pump element extending through the casing heads and providing intake and discharge channels for said pump, a revoluble pump element mounted on said fixed tubular pump element at a point between the casing heads, a rotor for said motor secured to and surrounding said revoluble pump element and having a bearing in one of the casing heads and an annular stator for said motor arranged between the casing heads and coacting therewith to enclose the pump elements and the rotor.

In witness whereof I affix my signature.

CONSTANTIN SZMUKLER.